(12) United States Patent
Shochat et al.

(10) Patent No.: US 9,271,454 B1
(45) Date of Patent: Mar. 1, 2016

(54) INTELLIGENT GARDENING SYSTEM AND METHOD

(71) Applicants: Jacob Shochat, Mahwah, NJ (US); Alexander Natanzon, Upper Saddle River, NJ (US); Ludmila Natanzon, Upper Saddle River, NJ (US); Vitaly Roginsky, Mahwah, NJ (US)

(72) Inventors: Jacob Shochat, Mahwah, NJ (US); Alexander Natanzon, Upper Saddle River, NJ (US); Ludmila Natanzon, Upper Saddle River, NJ (US); Vitaly Roginsky, Mahwah, NJ (US)

( * ) Notice: Subject to any disclaimer, the term of this patent is extended or adjusted under 35 U.S.C. 154(b) by 408 days.

(21) Appl. No.: 13/694,833

(22) Filed: Jan. 9, 2013

(51) Int. Cl.
*A01G 25/16* (2006.01)
*A01G 27/00* (2006.01)
*A47G 19/22* (2006.01)
*H04N 5/232* (2006.01)

(52) U.S. Cl.
CPC .......... *A01G 25/167* (2013.01); *A01G 27/003* (2013.01); *A47G 19/2227* (2013.01); *H04N 5/23206* (2013.01)

(58) Field of Classification Search
CPC .............. A01G 25/167; A01G 27/003; A47G 19/2227; H04Q 2209/43; H04Q 9/00; H04W 4/12; H04N 5/23206
USPC ............ 700/275, 282–284; 702/1–3; 47/65.5, 47/79, 82; 340/500, 540, 568.1, 572.1, 340/572.4, 572.8, 572.9, 603, 604
See application file for complete search history.

(56) References Cited

U.S. PATENT DOCUMENTS

| | | | |
|---|---|---|---|
| 5,992,092 A | 11/1999 | Furuta | |
| 7,110,862 B2 * | 9/2006 | Park | 700/284 |
| 8,471,707 B2 * | 6/2013 | Frohlick et al. | 340/572.4 |
| 8,836,504 B2 * | 9/2014 | Kohler et al. | 340/540 |
| 9,036,056 B2 * | 5/2015 | Ohtsuka | 348/239 |
| 2004/0036484 A1 | 2/2004 | Tamai | |
| 2010/0182518 A1 * | 7/2010 | Kirmse et al. | 348/836 |
| 2011/0144812 A1 | 6/2011 | Davis et al. | |
| 2013/0060473 A1 * | 3/2013 | Tomida | 702/3 |

* cited by examiner

*Primary Examiner* — Crystal J Barnes-Bullock

(57) ABSTRACT

An intelligent gardening system and method for monitoring and analyzing a moisture level in individual gardening pots and/or containers is provided. A system comprises a moisture measuring sensor integrated into a pot/container. A gardener can read moisture-related data using a mobile device, a computer, or a tablet, or directly from built-in display. The gardener can send the moisture level-related data along with other data (such as, a type of a plant, a soil type, size of a pot, a plant size, location, current weather, an air temperature, etc.) to a central server connected to a central gardening database or to a cloud service and receive gardening recommendations. The gardening recommendations can include other recommendations pertaining to a particular plant and gardening conditions.

15 Claims, 10 Drawing Sheets

INTELLIGENT GARDENING SYSTEM AND METHOD

BACKGROUND OF THE INVENTION

1. Field of the Invention

This invention relates to a gardening system and a method, and more particularly to an improved and efficient system for watering plants in various types of pots or gardening containers.

2. Description of the Related Art

An integral part of gardening is providing adequate moisture to the plants. Conventional watering tools range from a simple watering can to automated sprinkling systems. Watering is critical to growing plans in private gardens, as well as at the commercial gardens or farms. However, providing correct volumes of water to the plants is even more critical. While too little water results in drying and perishing of the plants, too much moisture can result in rotten plant roots, which results in perished or poorly grown plants as well.

Therefore, measuring and monitoring of the soil moisture content is very crucial, especially in case of large number of pottery and other plant growing bedding (i.e., containers) placed in multiple locations over a substantial territory—for example in a large number of the flower pots positioned over a family property or all over a large commercial gardening site.

Conventional soil moisture measurement systems employing automated watering (or sprinkling) systems use an "across the board" moisture measuring probe, which only indicates that "a soil moisture level is below a preset parameter." Obviously, such systems do not work well for the gardeners growing different types of plants or flowers requiring completely different watering patterns and moisture levels for the most efficient growth.

Moisture content within each individual flower pot or plant container is a most crucial parameter vitally affecting the development and vegetation of the flowers and/or plants. Contrary to a common belief that high enough moisture level secures the normal development of the plant/flower, the good gardening practice requires more thorough control of the moisture within a relatively confined range. The desired moisture levels differ not only from plant to plant, but also according to a phase of the plant development and deviations of the other ambient parameters (e.g., an air/soil temperature, intensity and duration of a day light time, etc.).

Moreover, according to a good gardening practice, the moisture monitoring should be performed at the plant roots, rather than at an arbitrary point (close to the surface of the pot). This requires correct placement or even relocation of a moisture probe along the soil levels from the roots to the surface. However, the conventional moisture probes or automated moisture measuring systems do not provide for efficient measuring at different soil levels on a pot-to-pot basis. Additionally, it is desired by the gardeners to be able to process soil moisture-related data and acquire some watering (or other) recommendations for a particular type of a plant, soil type, climate, etc. None of the existing systems provide the desired services.

For example, US Patent Publication 2004/0036484 describes a measuring device embedded into a pot and exposed to the pottery soil next to the wall of the pot. The measuring device has an electric circuitry having a resonance frequency, which depends on the moisture level of the pot soil. The resonance frequency is determined by means of pairing an embedded device with an external radio transmitter, which sweeps certain frequency range and identifies the resonant frequency as the one that exhibits the best radio-wave pairing between devices.

Although the proposed device does exhibit the pairing between an embedded part and an external one, this pairing is rather used as a metrological instrument and does not provide for a true data exchange between the moisture measuring device and an external information system of any kind.

The US Pat. Publication 2011/0144812 and the U.S. Pat. No. 5,992,092 describe devices for automated watering of the pottery plants. Although these systems have multiple embedded moisture sensors, their outputs are not available, neither for an immediate human perception, nor for a transfer to an external intelligent information system for analysis and recommendations. Instead, the moisture level-related data is used as a feedback signal in a hard-coded inflexible internal control loop.

In both inventions, the moisture sensor is located on the surface of the pot often quite far from the plant's root system and, thus, does not provide the measurements of crucial importance for the plant development.

Therefore, a system targeted towards a seamless transfer of moisture sensor readouts to an external scalable multi-tiered information system capable of analyzing the moisture level-related data and making recommendations to a gardener is desired. Such system does not require a gardener to manually measure the level of moister and allows the gardener to conveniently read the soil moisture level measurements, send them for processing and receive watering (or other) recommendations.

Accordingly, a method and system for efficient measuring, reading and analyzing the soil moisture level data is desired.

SUMMARY OF THE INVENTION

Accordingly, the present invention is related to a gardening system and method for improved and efficient watering of the plans in various types of pots or containers that substantially obviates one or more of the disadvantages of the related art.

In one aspect, a system for monitoring and analyzing a moisture level in individual gardening pots and/or containers is provided. A system comprises a moisture measuring sensor integrated into a pot/container. A gardener can read moisture-related data using a mobile device, a computer or a tablet or the gardener can read the moisture-related data from the moisture sensor display. The gardener can send the moisture level-related data along with other data (such as, a type of a plant, a soil type, size of a pot, a plant size, location, current weather, an air temperature, etc.) to a central server connected to a gardening and/or weather database and receive gardening recommendations. The gardening recommendations are not limited to watering only. They can include other recommendations pertaining to a particular plant and gardening conditions.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
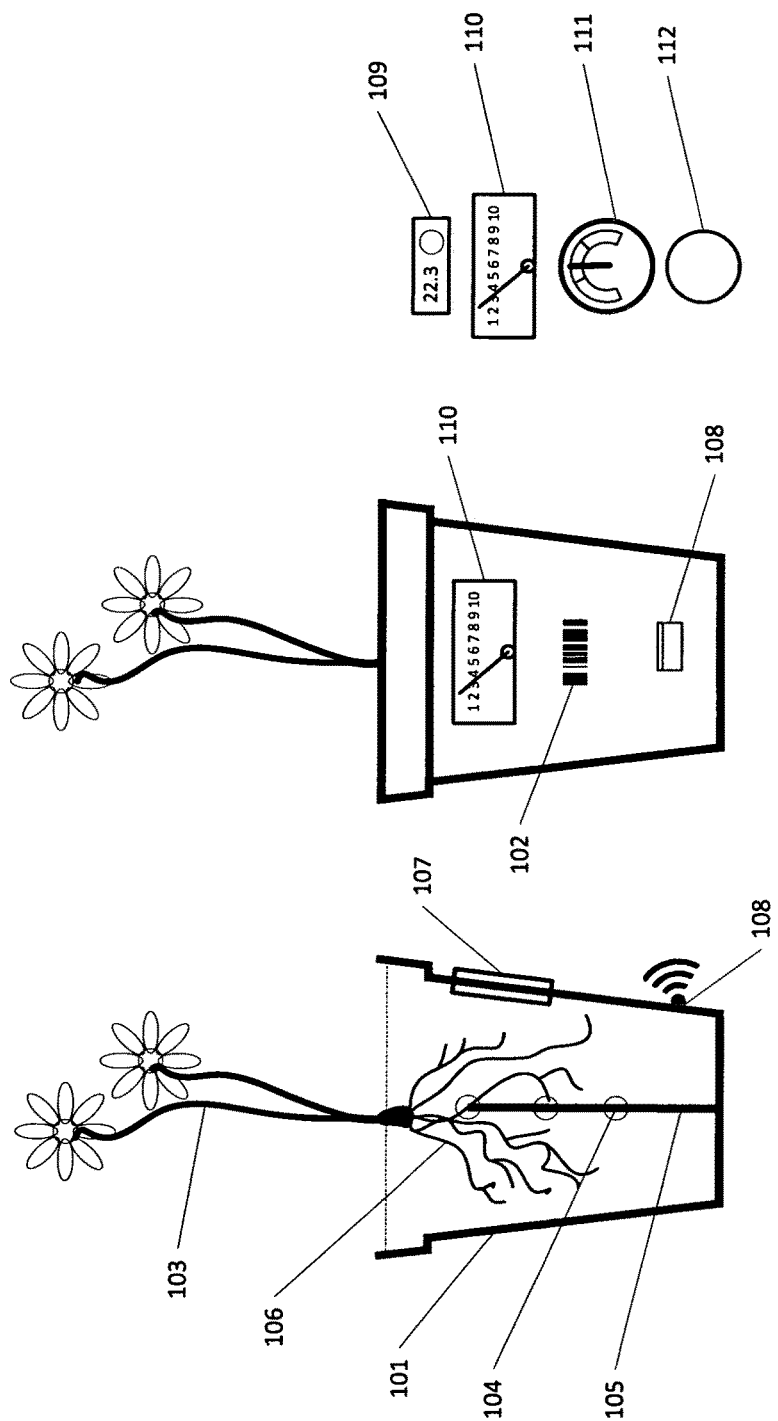
FIG. 1 illustrates a simplistic single-tiered configuration of a system, in accordance with the exemplary embodiment.

Reference will now be made in detail to the preferred embodiments of the present invention, examples of which are illustrated in the accompanying drawings.

The present invention is directed to a method and system for improving efficiency of gardening using integrated soil moisture measuring gauge and a mobile device connected to a server for analyzing the moisture-related data.

According to an exemplary embodiment, a system for monitoring and analyzing a moisture level in individual gardening pots and/or containers is provided. A system comprises a moisture measuring sensor integrated into a pot/container. A gardener can read moisture-related data using a mobile device, a computer or a tablet or directly from the integrated display. The gardener can send the moisture level-related data along with other data (such as, a type of plant, a soil type, size of a pot, a plant size, a location, current weather, an air temperature, etc.) to a central server connected to a gardening database and receive gardening recommendations to the gardener's mobile device. The gardening recommendations are not limited to watering only. They can include other recommendations pertaining to a particular plant and gardening conditions.

According to the exemplary embodiment, the mobile devices can be any mobile phone or tablets (e.g., IPhone™, Android™, iPad™, Samsung™ tablets, etc.). The purpose of the proposed invention is to deliver a versatile, inexpensive and efficient moisture monitoring system integrated into garden pottery or into other soil bedding confinement structures.

The proposed system, advantageously, provides for: (1) an easy and convenient human observation and perception of the gardening data readouts, and (2) a seamless data acquisition, collection and passing to external information system for review and analysis. According to the exemplary embodiment, the system also provides for: (1) an easy planning of corrective actions based on the acquired data only; (2) planning of corrective actions according to the plant vegetation phase and current specifics of the gardening environment (air temperature, daylight duration, external humidity, etc.); and (3) planning corrective actions taking into account multiple external data sources like a gardening knowledgebase, weather forecast, geographic area statistics, etc.

According to one exemplary embodiment, seamless data acquisition and logging provide the following benefits:

ergonomic and convenient human perception of the moisture gauge read-out;

an effective data logging and analysis of the historical gardening trends;

an effective data logging and generation of a "Normal Gardening Database" summarizing the positive and the most successful historical cases;

planning of corrective actions based on comparison of the current data against the "Normal Gardening Database";

exploitation of the external "Normal Gardening Databases" and other knowledge bases;

effective monitoring, data logging and analysis, and data exchange with other gardeners by means of party-to-party communications or through social and/or professional networking.

FIG. 1 illustrates a simplistic single-tiered configuration of a system, in accordance with the exemplary embodiment. The exemplary system comprises a standalone pot (or another soil containing device) 101 with a tag 102 positioned on the outer surface of the pot 101 for its visual unique identification. The pot 101 contains a plant or other sort of vegetation 103. The pot 101 has an embedded moisture probing system comprising a single moisture probe 104 or an array of the moisture probes integrated into a supporting pole structure 105 rising from the bottom of the pot 101 towards the plant roots 106.

The pole structure 105 can be equipped with a motion actuator capable of repositioning the probes 104 from one preferred location within the pottery soil to another location. The probe 104 is electrically connected to a calibrated gauging unit 107, which converts the probe electrical signal into a representation of the actual soil moisture level expressed in conventional units (i.e., gauge readout). The gauge read-out data is transferred to a pairing circuit, which can be a pairing circuit capable of wireless pairing with a remote information system (e.g., a portable mobile device—a smart-phone, a tablet or alike).

Alternatively, a stationary information system paired to a pairing circuit 108 via some extended network infrastructure can be used. The pot 101 has a digital display 109, or a needle and scale display 110 consisting of a needle moving over the background scale of integer notches in response to the input from the gauge, or a needle and sector display 111 consisting of a needle moving over the background of the contiguous colored sectors in response to the input from the gauge, or a color-coding display 112 consisting of a shape that changes its color/shade/shape in response to the input from the gauge.

In addition to providing immediate human-interpretation capacity, the displays of type 109-112 can have a video capturing capability and providing the video content to the mobile device. According to the exemplary embodiment, the system transmits the sensor read out to the gauge. The system can also transmit control commands from the pairing circuit to the sensor. The exemplary system also performs pairing with a mobile device and sending the sensor(s) reading to the mobile device for display to the user (i.e., a gardener) and/or interpretation and/or storage.

Figure 2:
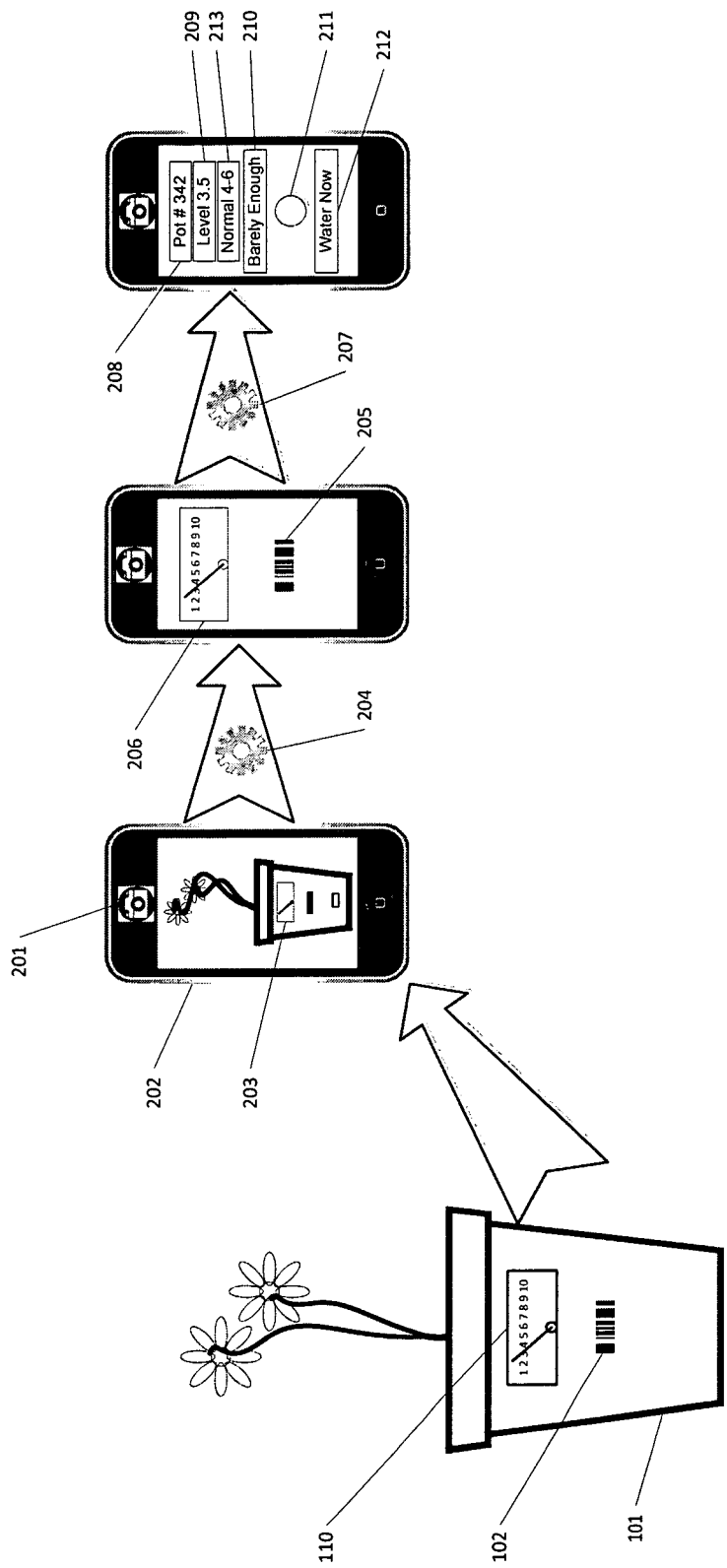
FIG. 2 illustrates a double-tiered system, in accordance with the exemplary embodiment.

FIG. 2 illustrates a double-tiered system, in accordance with the exemplary embodiment. A mobile device 202 is paired to the single tiered system (FIG. 1). The mobile device 202 has a built-in camera 201, which is used to capture a video containing a pot identifier 102 and a visual data of the displays 109-112. Thus, the camera 201 translates the gauge readout into a digital data processed by a mobile device, which provides a recommendation based on this data.

As a result, the digital camera 201 generates a digital representation of the visual scene 203 and stores it in the memory of the mobile device 202. The digital representation is forwarded for processing to the visual scene recognition engine 204 running within the CPU of the mobile device 202. The scene recognition engine extracts a digital image 205 of the pot identification tag 102 and the image 206 of the moisture display 110. The extracted images are further forwarded to a scene interpretation engine 207, which runs special text and graphical processing algorithms (e.g., OCR or barcode recognition—BCR) in order to recognize the alphanumeric and/or graphical data visualized and/or encoded within the captured digital scene. The moisture level value 209 is derived and stored into the memory of the mobile device 202 along with a corresponding identified pot ID 208.

Note that both of these values are displayed on the device screen for reading by the device owner (gardener). Based on the moisture level 209, the mobile device 202 also optionally displays to the gardener the preferred moisture level 213 for the plant 103 growing in the pot 101 retrieved from a database for the pot ID 208. The mobile device 202 displays recommendations in a form of a text 210, color-coded pictogram 211, as well as moisture control actions 212.

Figure 3:
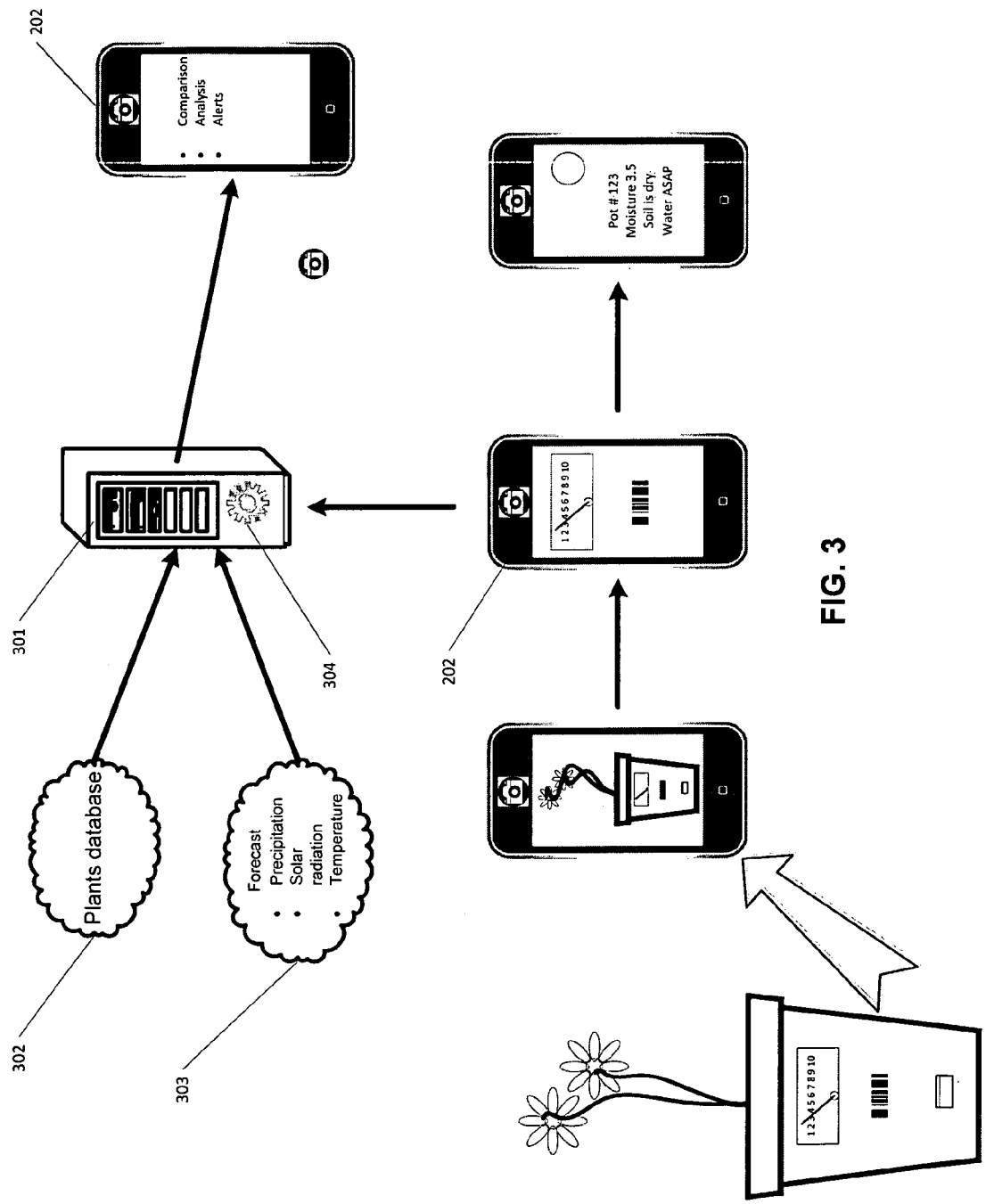
FIG. 3 illustrates an exemplary gardening system connected to a PC and to a processing database for the purpose of aggregation, storage, access, analysis and comparison of the gardening data.

FIG. 3 illustrates an exemplary gardening system connected to a stationary computing device 301 and to a processing database 304 for the purpose of aggregation, storage, access, analysis and comparison of the gardening data. The database 304 is hosted by the stationary PC or other computing device 301. However, the database 304 can be hosted by a mobile device 202 or a laptop or a tablet.

The PC 301 and the processing database 304 are connected to an external internet-based intelligence sources, such as a central plant database 302 and weather forecast service 303. The usage of these sources can result in refined moisture controlled actions considering a development phase of the plant, rain probability for next time period, etc.

The database 304 can be accessed by any of the household mobile device or computers. For example a smart-phone is preferably used for reaching out to confined data pieces from remote locations, while such operations as comparison, analysis and presentation of the large data arrays are preferably performed by a notebook and/or PC due to their superior user interfaces, screen sizes, resolution and computing power.

The triple-tiered embodiment database employs periodic access to the external data and the knowledge sources for the benefit of the vitals monitoring and control, data and benefits may include but not limited to: precipitation forecast for the area for better watering dosage; solar radiation forecast for the area for better watering dosage; temperature forecast for the area for better watering and/or fertilizer's dosage.

Figure 4:
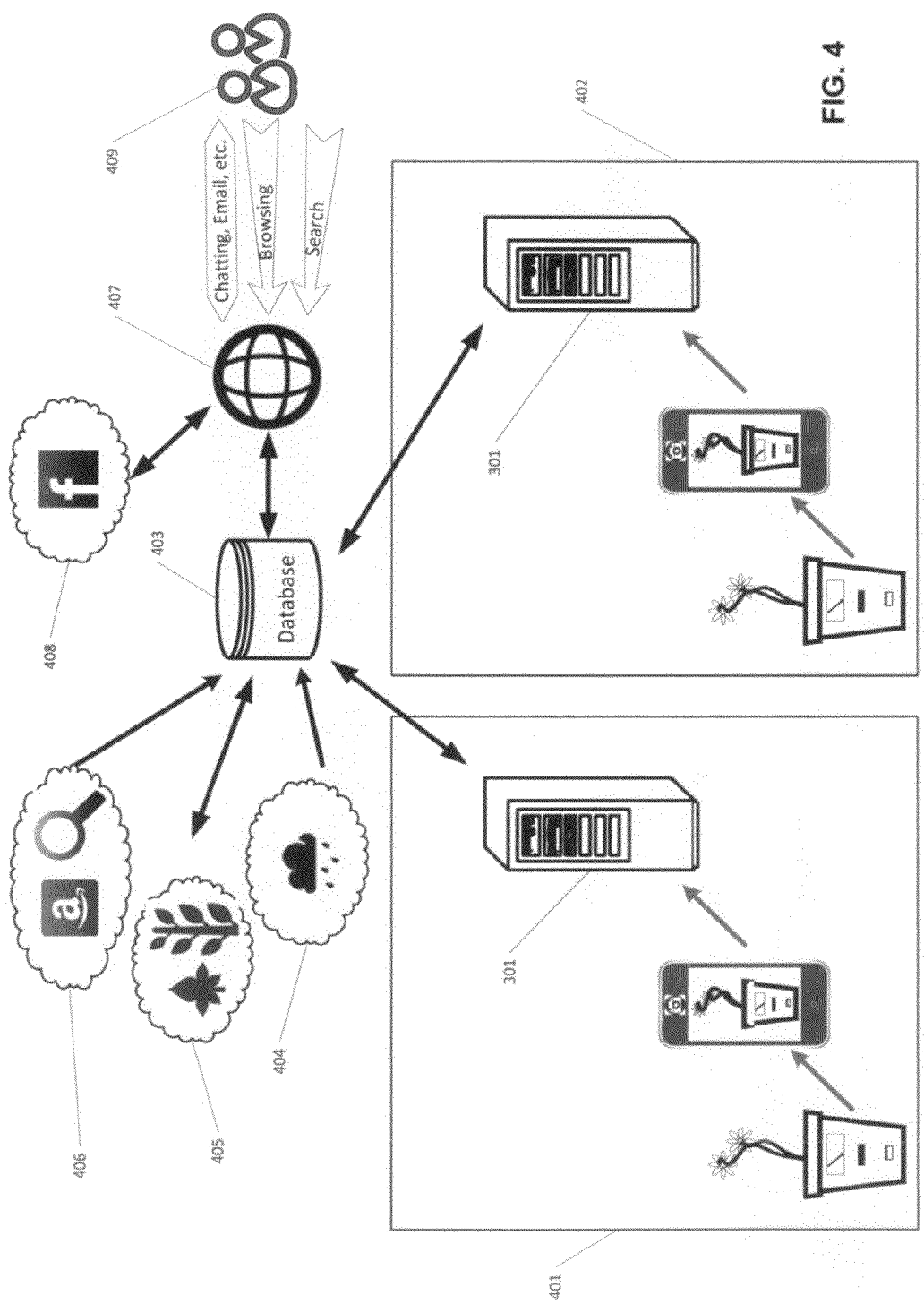
FIG. 4 illustrates exemplary gardening systems sharing some data into a common cloud-based database.

FIG. 4 illustrates exemplary gardening systems of the type described in FIG. 3 sharing some data into a common cloud-based database. Sharing some data into a common cloud-based database 403 provides additional advantages to the individual gardeners, as it allows for wider comparison and analysis of the nation-wide (or even a world-wide) collection of the gardening data, observations and tricks of individual gardeners, as well as a centralized access and rectification of the information from other external nation-wide or regional intelligence sources aggregated over a major geographical scale.

For example, the individual gardeners using the systems 401 and 402 similar to that described in FIG. 3 can get an aggregated weather forecast 404, an aggregated plant data 405, and an aggregated product-and-services data 406. Alternatively, the individual users 409 may not even use sophisticated systems of the type 401 integrated into the central database. The users also can get access to the databases and connected external sources via a public internet portal 407 connected to the central database 403 and providing links to the external social and professional networks 408 for effective browsing, searching, blogging and other types of person-to-community and person-to-person communications.

This embodiment supports interconnectivity between the different users and facilitates their interaction in a manner of the social-alike, professional-alike or hobby-alike networks including but not limiting to the following activities:

1. Sharing experience and data;
2. Posting images, personal stories and data;
3. Seeking for advise, blogging and commenting;
4. Advertising and targeted advertising;
5. Interconnectivity with other social networks and data sharing tools including, but not limited to Twitter, Facebook, Picasa, Google+, etc.;
6. Employing the external powerful engines for search and research (e.g., for plant identification, relation to normal data base, etc.).

Figure 5:
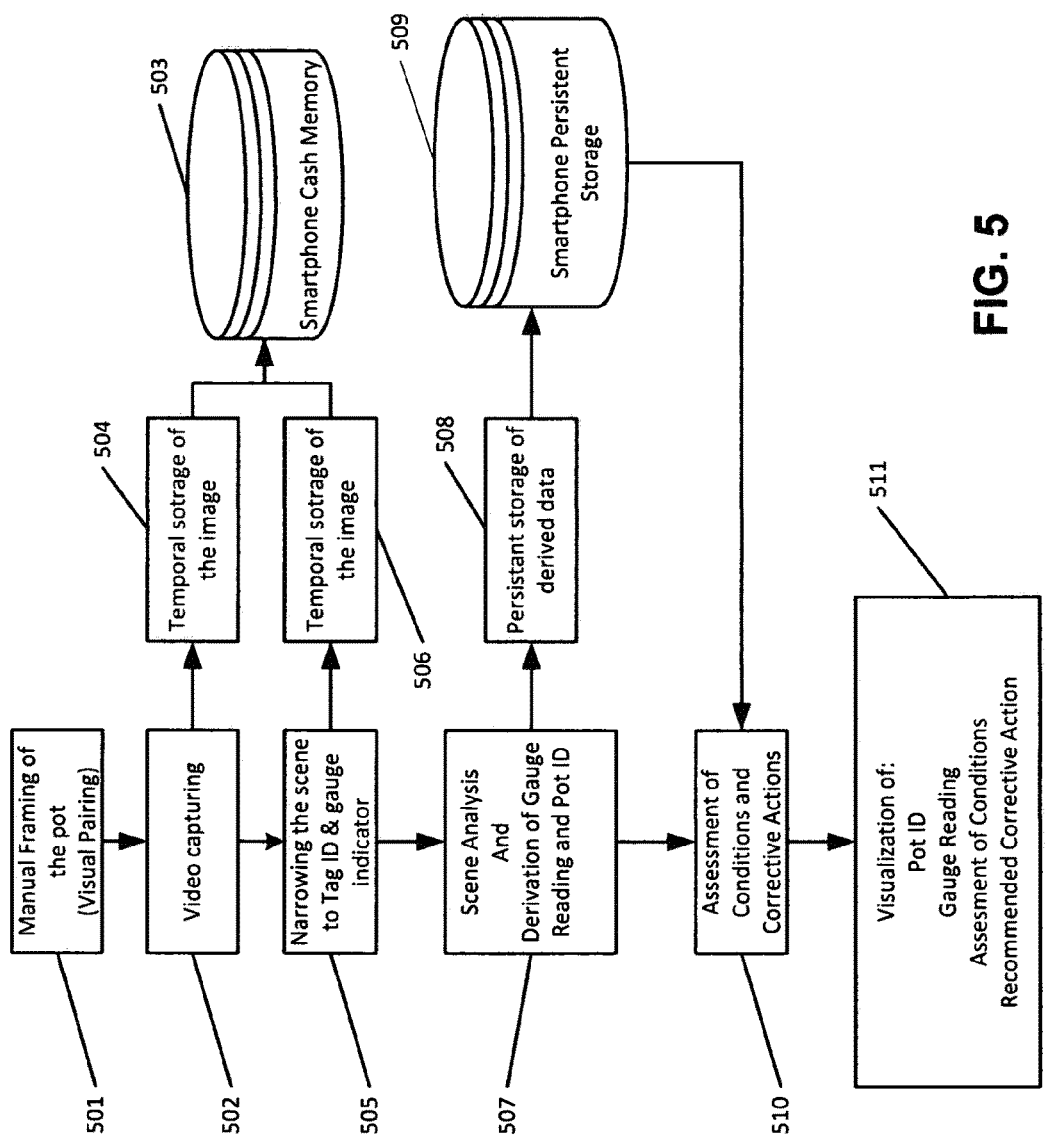
FIG. 5 illustrates a data flow of the exemplary system depicted in FIG. 2.

FIG. 5 illustrates a data flow of the exemplary system depicted in FIG. 2. According to the exemplary embodiment, the original data is generated through manual framing of the pot (step 501) and video capturing (step 502). The resulting digital image is, then, subjected to temporal storage (step 504) in the smart-phone cash memory 503. In step 505, the image is processed for narrowing the captured scene to include a tag ID and gauge indicators only. Then, the narrowed scene is subjected to temporal storage (step 506) and forwarded to the processing block 507 for scene analysis and derivation of the gauge read-out and the pot ID.

The derived parameters are forwarded to the storage management block 508 for persistent storage in the smart-phone persistent memory 509. The derived parameters are provided to the processing block 510 for assessment of the moisture level condition of the respective plant growing in the pot identified by the ID and making recommendations regarding the required corrective actions. The derived parameters and recommendations are forwarded to the visualization block 511 for proper visual rendering on the user mobile device screen.

Figure 6:
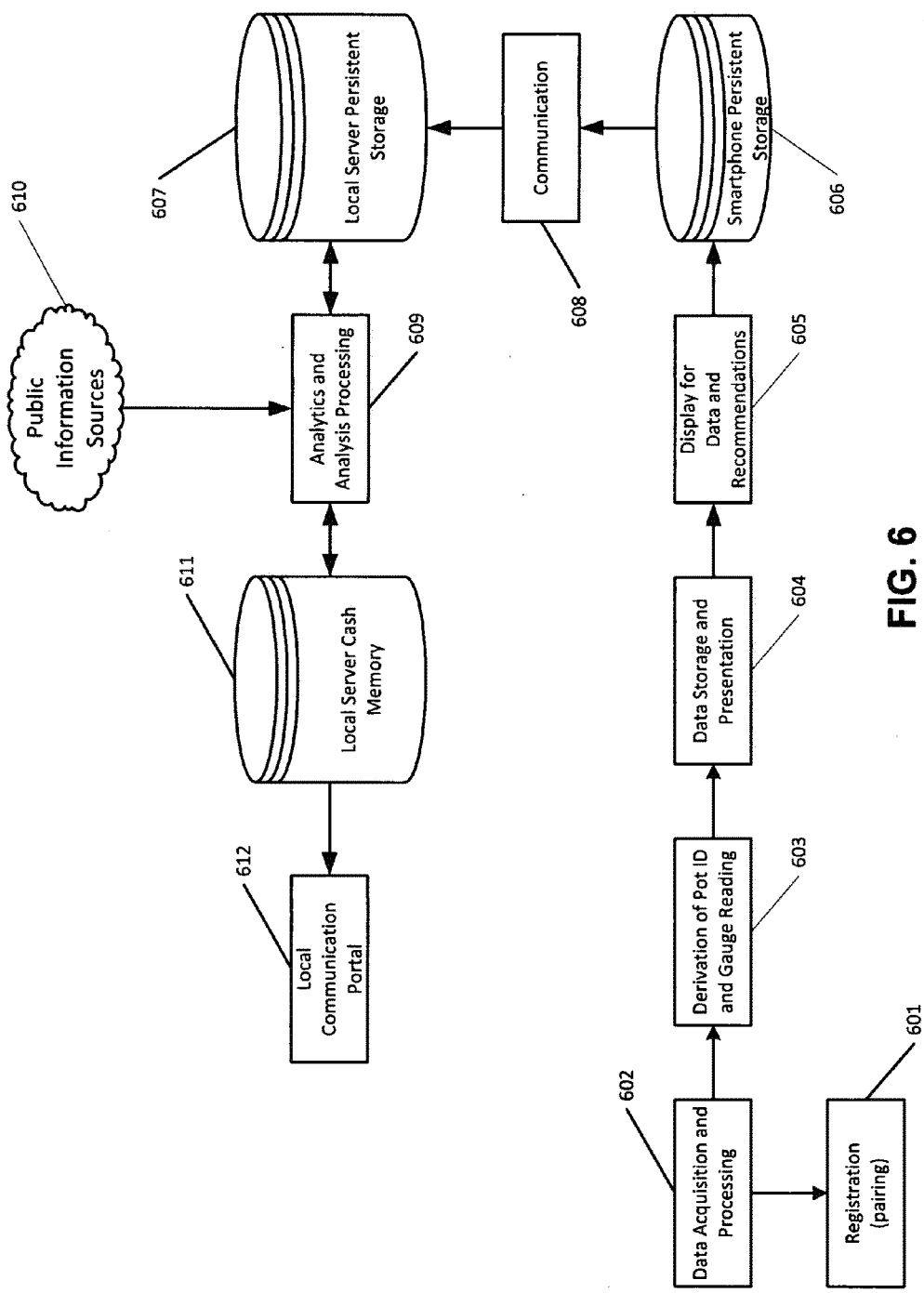
FIG. 6 illustrates a data flow of the exemplary system depicted in FIG. 3.

FIG. 6 illustrates a data flow of the exemplary system depicted in FIG. 3. According to this exemplary embodiment, the pairing process 601 between a pot and a mobile device initiates data acquisition and processing in block 602 responsible for generation of the raw data, which is then processed in the processing block 603. The derived pot ID and the gauge read-out are forwarded to the data storage and presentation block 604. Data and recommendations are displayed in the block 605 and are stored in the smart-phone storage 606.

Then, the data from the smart-phone persistent storage 606 is communicated to the Local Server Persistent Storage 607 by means of the communication block 608. The analysis block 609 receives data from server local storage 607 and from public information sources 610. The analysis block 609 produces the Analytics and Analysis Results and stores them in the local server cash memory 611. Then, a local communication and access block 612 implemented as communication portal makes these results accessible to home devices (laptops, PCs, or mobile devices 202).

Figure 7:
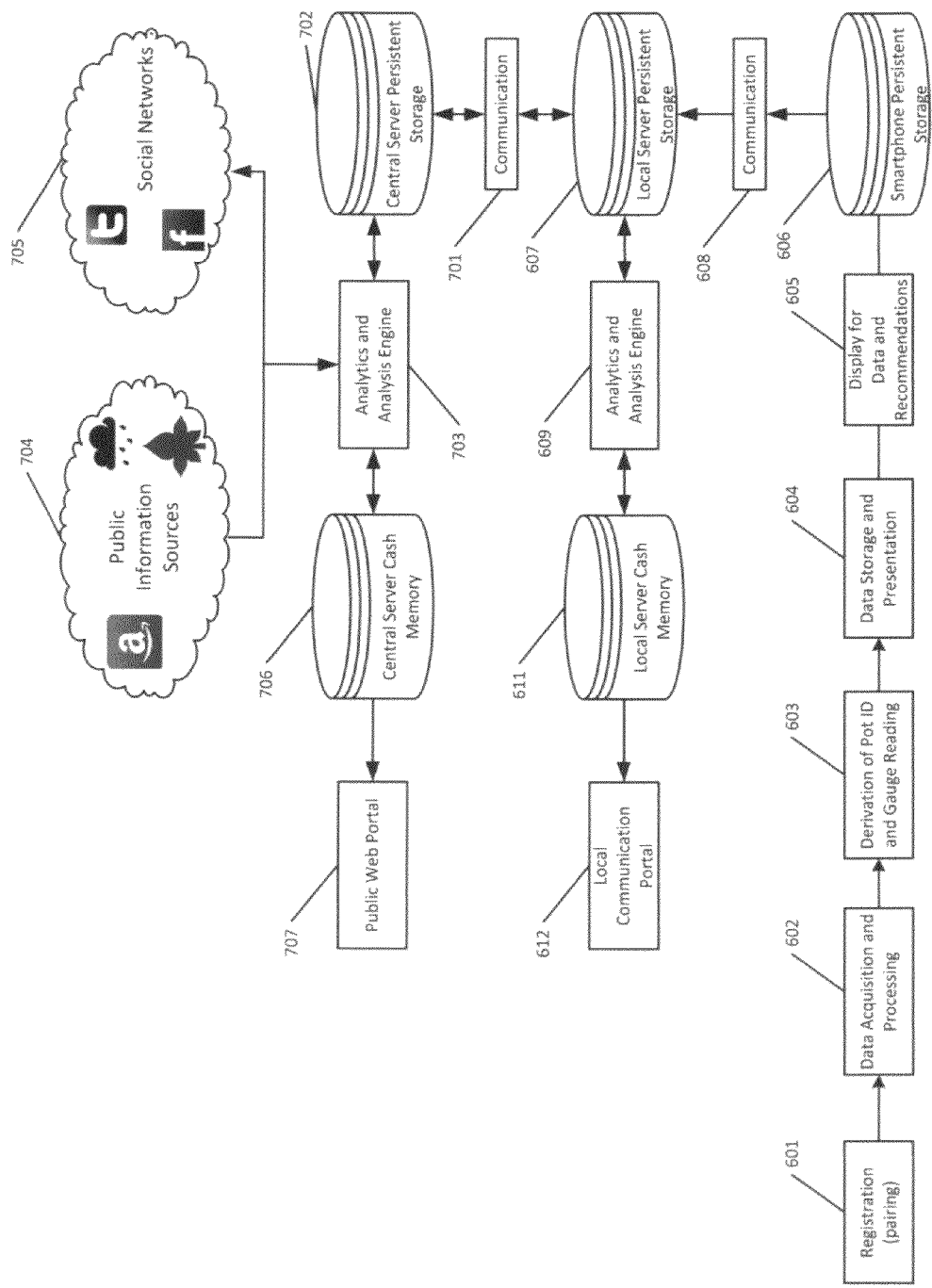
FIG. 7 illustrates a system work flow of gardening systems depicted in FIG. 4 sharing some data into a common cloud-based databases.

FIG. 7 illustrates a system work flow of gardening systems depicted in FIG. 4 sharing some data into a common cloud-based database. According to this exemplary embodiment, the pairing process 601 between a pot and a mobile device initiates data acquisition and processing in block 602 responsible for generation of the raw data, which is, then, processed in the processing block 603. The derived pot ID and the gauge read-out are forwarded to the data storage and presentation block 604. Data and recommendations are displayed in the block 605 and are stored in the smart-phone storage 606.

Then, the data from the smart-phone persistent storage 606 is communicated to the Local Server Persistent Storage 607 by means of the communication block 608. The analysis block 609 receives data from the server local storage 607 and (indirectly) from central (cloud) Server persistent storage 702 and public information sources 704. The analysis block 609 produces the Analytics and Analysis Results and stores them in the local server cash memory 611. Then, a local communication and access block 612 implemented as communication portal makes these results accessible to home devices (laptops, PCs, or mobile devices 202).

The local server persistent storage 607 provides (shares) data with a Central (cloud) Server persistent storage 702 via the communication block 701 performing two-way communication between the local data storage 607 and the central (cloud) data storage 702. The central data processing block 703 of the cloud system is connected to the central data storage 702 by two ways connection, to the external public information sources 704 by one-way connection and to the public social and professional networks 705 by two-way connection. The Analytical and Analysis data produced by the central processing block 703 are also forwarded to the central Server Cash memory 706 and accessed by the central public web portal 707 for free access by users from their laptops, home PC's or mobile and tablet devices 202.

Figure 8:
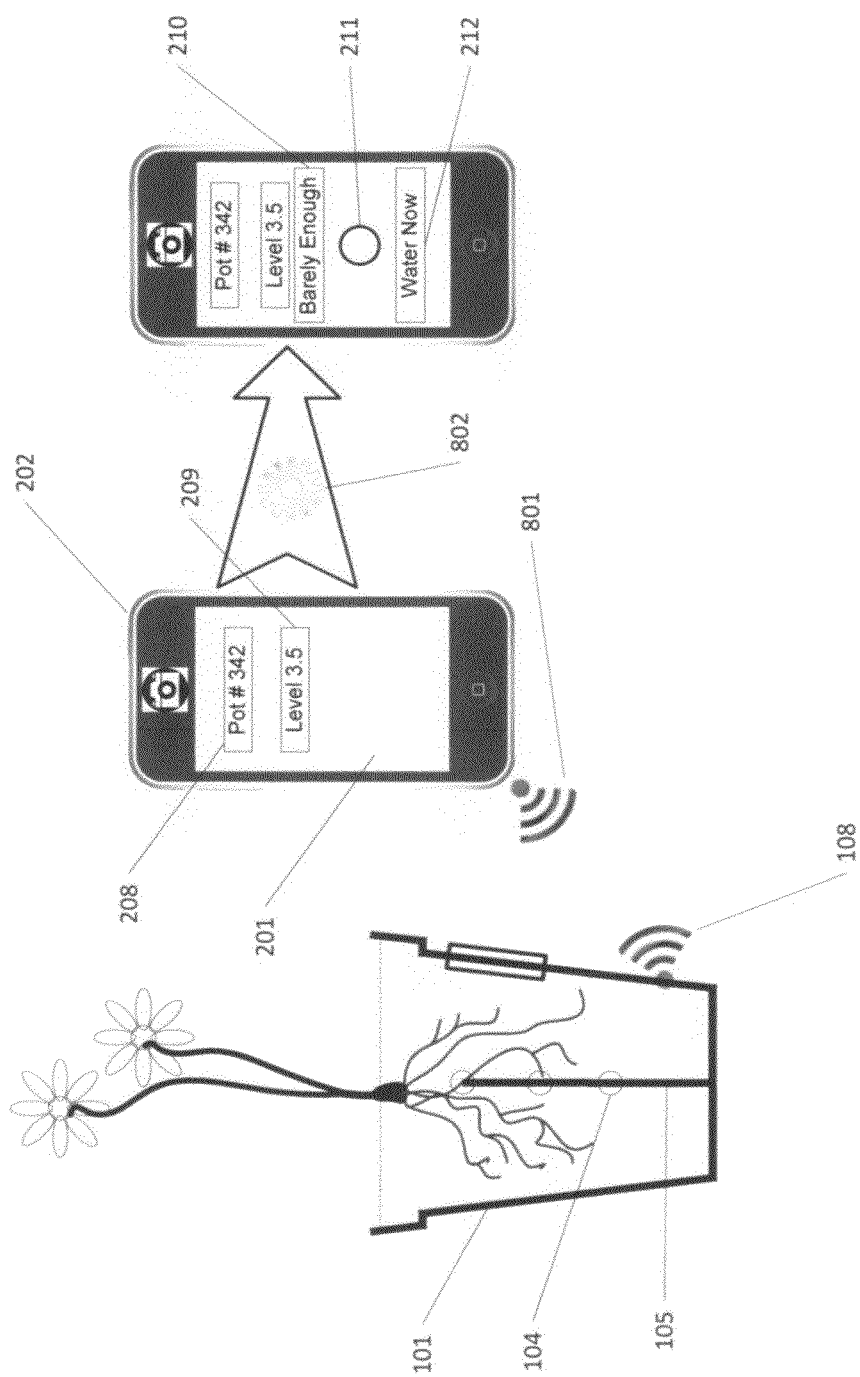
FIGS. 8 and 9 represent the double-tier embodiment that implements direct data and command pairing through wireless communication between dedicated pairing circuitry embedded into the pot structure and a native wireless adaptor of a mobile device.
Figure 9:
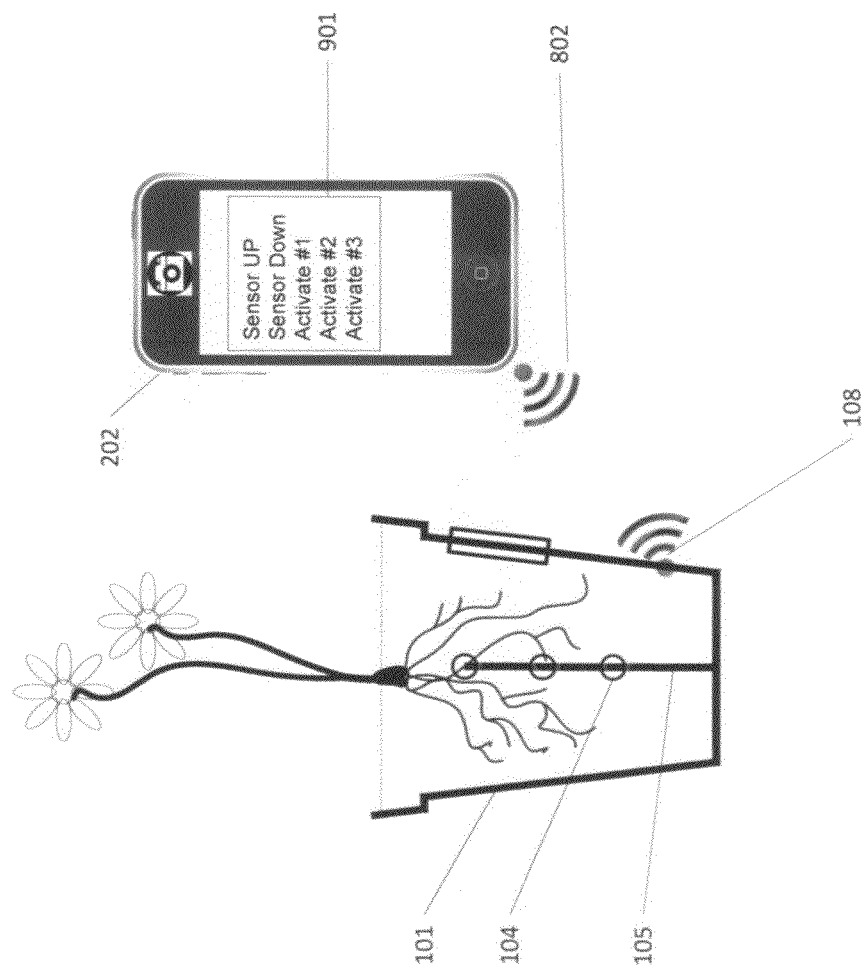

FIGS. 8 and 9 represent the double-tier embodiment that implements direct data and command pairing through wireless communication between dedicated pairing circuitry 108 embedded into the pot structure and a native wireless adaptor 801 of a mobile device. According to the embodiment depicted in FIG. 8, upon bringing the mobile device 202 in a relative proximity to the pot 101 their wireless circuits (801 and 108, respectively) establish mutual pairing and implement the transfer of the pot ID and the gauge read-out from the pot 101 onto the mobile device 202, which leads to immediate display of these values (208 and 209, respectively) on the mobile device display 201 and triggers the processing engine 802.

The processing engine 802 provides for interpretation of the gauge read-out respective to the plant and weather conditions and provides moisture level assessment in textual 210 and iconic 211 from along with the recommendation 212 for corrective actions. According to the embodiment depicted in FIG. 9, the mobile device 202 is used for controlling the probe configuration and/or position within the pot. Upon a successful pairing between wireless circuits 801 and 108, a user can activate (from his mobile device application) the control panel 901 allowing for control of the mechanical articulating support 105 and/or multiplexing between plurality of the moisture probes 104.

Figure 10:
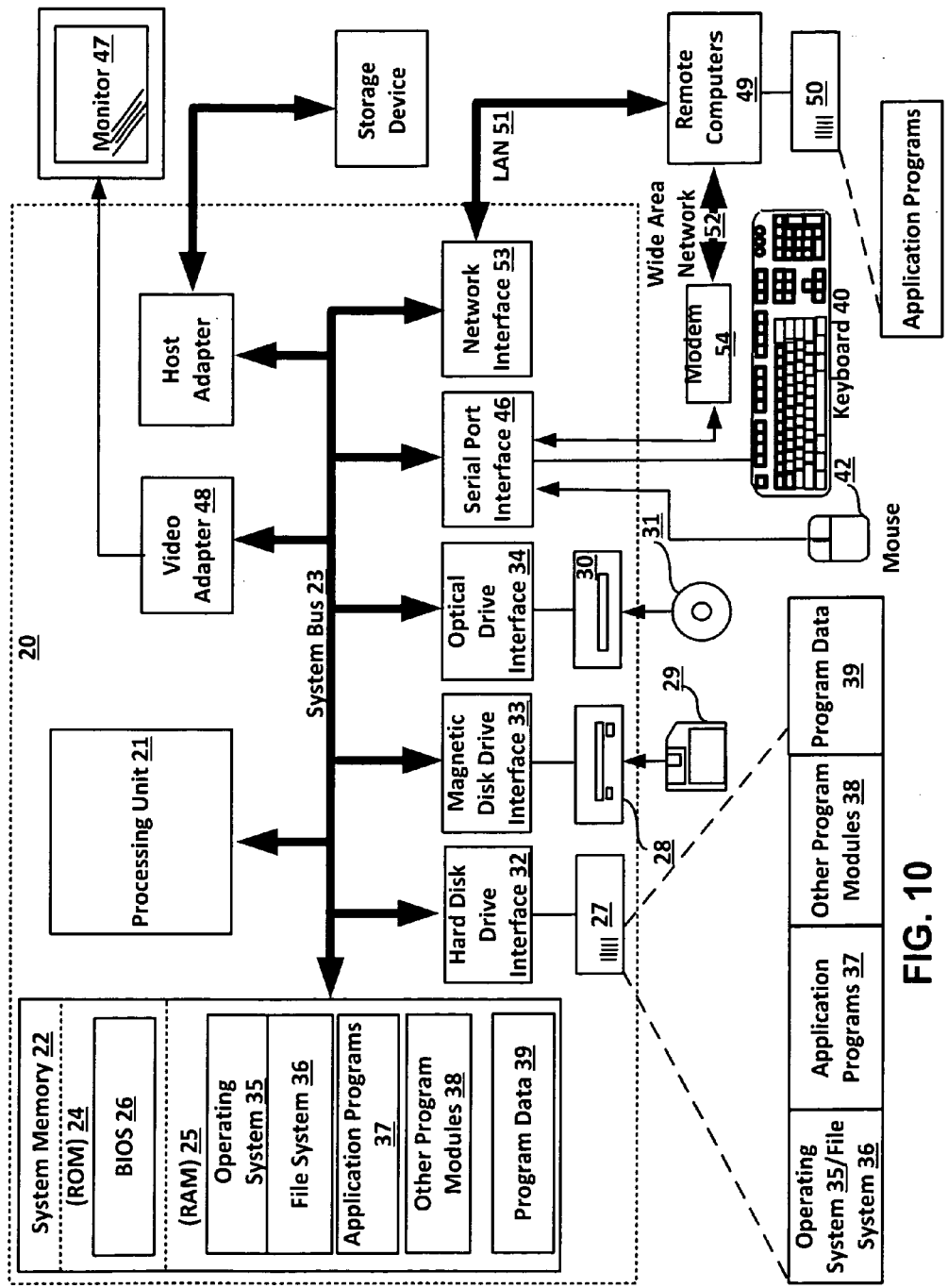
FIG. 10 illustrates an example of a computer system/server that can be used in the present invention.

FIG. 10 illustrates an example of a computer system or a server that can be used in the present invention. With reference to FIG. 10, an exemplary system for implementing the invention includes a general purpose computing device in the form of a computer/server 301 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 301 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer/server 301.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 301 includes a file system 36 associated with or included within the operating system 35, one or more application programs 37, other program modules 38 and program data 39. A user may enter commands and information into the computer 301 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer/server 301 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer/server 301 is connected to the local network 51 through a network interface or adapter 53. When used in a WAN networking environment, the computer/server 301 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer/server 301, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, the proposed method and system provide for a comprehensive gardening system allowing a gardener to acquire gardening data, send it to a server for analysis and receive recommendations.

It should also be appreciated that various modifications, adaptations, and alternative embodiments thereof may be made within the scope and spirit of the present invention. The invention is further defined by the following claims.

What is claimed is:

1. A gardening method comprising:
    integrating a moisture level sensor with a display into a pot having a pot ID tag;
    launching a gardening application on a mobile device;
    acquiring video data from the display of the moisture level sensor by the mobile device;
    storing the video data into a cache memory of the mobile device;
    narrowing the video data to the pot ID tag and to a current moisture level data;
    deriving the current moisture level data and the ID tag from the narrowed video data;
    storing the derived current moisture level data and the ID tag into a persistent memory of the mobile device;
    analyzing the current moisture level data and generating gardening recommendations by the gardening application; and
    rendering the gardening recommendations on a screen of the mobile device and implementing the recommendations by a gardener.

2. The method of claim 1, further comprising connecting the mobile device to a remote server, wherein the server acquires gardening recommendations from a public information database.

3. The method of claim 2, wherein the server is a cloud server connected to any of: a plurality of gardening information sources, to a central gardening database and to social networks.

4. The method of claim 2, wherein the mobile device provides to the server any of:
    a plant type;
    an air temperature;
    a duration of a day light;
    a geographic location;
    soil physical and chemical properties; and
    a soil type.

5. The method of claim 1, further comprising controlling positioning of the moisture sensor by the mobile device via the mobile device gardening application.

6. The method of claim 1, wherein the values of the pot ID and the moisture level data are acquired by the mobile device via a wireless connection established between the mobile device and a pot pairing circuitry.

7. The method of claim 6, further comprising controlling positioning of the moisture sensor in a vertical plane from the mobile device.

8. The method of claim 6, further comprising controlling multiplexing between a plurality of moisture sensors from the mobile device.

9. The method of claim 1, wherein the deriving of the moisture level data and the pod ID tag from the narrowed video data is performed by a scene interpretation engine running on the mobile device.

10. The method of claim 1, wherein the moisture sensor is positioned at a root of a plant.

11. The method of claim 1, further comprising integrating into the pot a plurality of moisture sensors connected to the display.

12. An intelligent gardening system comprising:
    a gardening pot;
    a pot ID tag affixed to the pot; and
    at least one moisture sensor integrated into the pot, the moisture sensor has a display for rendering a moisture level data and the pot ID to a gardener,
    wherein:
        the moisture level sensor is configured to provide the moisture level data to a mobile device;
        the mobile device is configured to acquire a video data from the moisture level sensor display and to derive a current moisture level data and the pot ID from the video data using a mobile gardening application; and
        the mobile device gardening application is configured to analyze the moisture level data and to render gardening recommendations to a user on a mobile device screen.

13. The system of claim 12, further comprising a wireless pairing connector integrated into the pot for connecting to a mobile device, wherein the wireless pairing connector receives data from the moisture sensor and provides it to the gardener's mobile device.

14. The system of claim 12 comprising an array of moisture sensor probes integrated into a supporting pole structure rising from a bottom of the pot.

15. The system of claim 14, wherein positioning of the supporting pole with the array of moisture sensor probes is movable and remotely controllable from the mobile device via the wireless pairing connector integrated into the pot.

* * * * *